Patented Mar. 27, 1923.

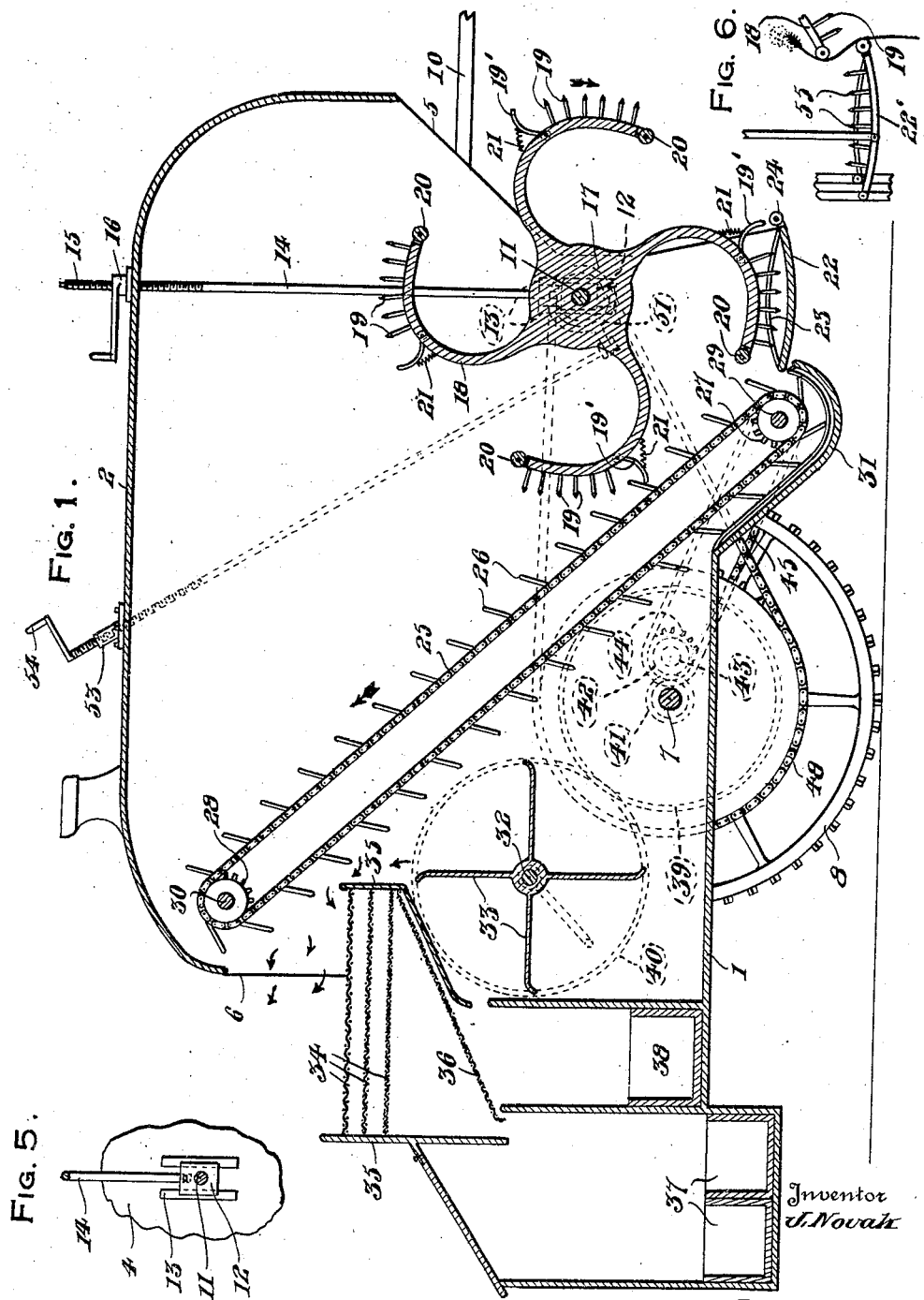

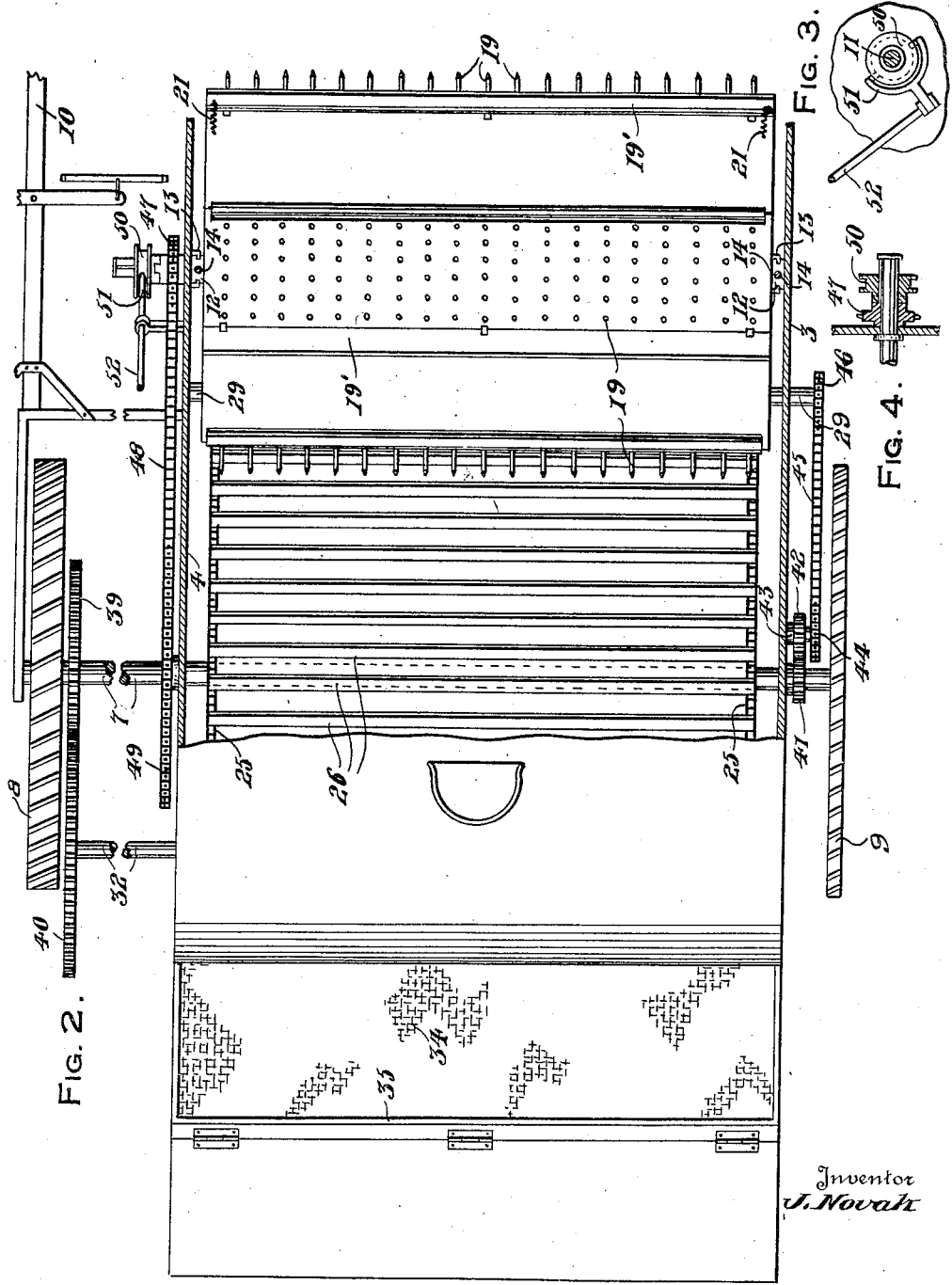

1,449,869

UNITED STATES PATENT OFFICE.

JAMES NOVAK, OF MADISON, OHIO.

HARVESTER.

Application filed October 20, 1921. Serial No. 509,029.

*To all whom it may concern:*

Be it known that I, JAMES NOVAK, a citizen of the United States of America, residing at Madison, in the county of Lake and State of Ohio, have invented certain new and useful Improvements in Harvesters, of which the following is a specification.

This invention relates to certain new and useful improvements in harvesters and has particular reference to a harvesting machine adapted for threshing grain while traveling through a field of growing grain.

The primary object of the invention resides in the provision of a harvesting machine designed to sever the tops of grain stalks while traveling through a field of grain with devices for separating the grain from the pods, discharging the refuse from the machine and conveying the grain to sifting screens for delivery into receptacles at the rear end of the machine.

The device further embodies the idea of driving the grain cutting and threshing device, the grain conveyor and a fan from the ground wheels.

With the above general objects in view and others that will appear as the nature of the invention is better understood the same consists of the novel form, combination and arrangement of parts hereinafter more fully described, shown in the accompanying drawings and claimed.

In the drawings, wherein like reference characters designate corresponding parts throughout the several views, Figure 1 is a longitudinal sectional view of a harvesting machine constructed in accordance with the present invention showing the grain topping device, the conveyor, the fan blower and the sifting screens, Figure 2 is a top plan view, partially shown in section, Figures 3 and 4 are fragmentary side elevational and sectional views respectively of the controlling clutch for the grain topping device, Figure 5 is a fragmentary side elevational view, partly in section showing the vertically adjustable block for supporting the shaft of the grain topping device, and Figure 6 is a detailed fragmentary end elevational view of a modified form of tray cooperating with the topping device.

Referring more in detail to the drawings, there is illustrated a harvesting machine embodying a body portion formed of a bottom wall 1, a top wall 2 and side walls 3 and 4, an opening 5 at the forward end of the machine accommodating the grain topping device and an opening 6 in the rear end of the machine providing an escape for the chaff and refuse, the body being supported on an axle 7 carrying ground wheels 8 and 9 as clearly shown in Fig. 2 while a draft frame 10 connected to the body and axle may be connected to any suitable source of draft power.

A grain topping device is arranged adjacent the forward open end 5 of the harvester body and embodies an axial mounting 11 journaled through a block 12 as shown in Figs. 1 and 5 with the block vertically slidable in guides 13 and operable by a perpendicular rod 14 threaded at its upper end as at 15 and extending through the upper wall 2 of the body with a wrench 16 threaded on the upper end for vertically shifting the block. The grain topper embodies a central hub portion 17 having radial curved arms 18 extending in the same direction with a plurality of prongs 19 projecting outwardly from the outer face of the curved arms 18 as clearly shown in Fig. 1, the free edge of each arm being provided with a roller 20 while the rear prongs 19' are tensioned as at 21 for purposes presently to appear.

A pan or tray 22 cooperating with the topping arms 18 provides for the threshing of the grain, or the separation of the grain from the pods, the tray 22 being concaved as illustrated in Fig. 1 and carrying spaced ratchet rods 23 extending between the forward and rear edges thereof, a roller 24 being carried by the forward edge of the tray 22 for engagement with the stalks of the grain.

An endless conveyor in the form of a sprocket chain 25 carrying spaced flights 26 passes over sprocket wheels 27 and 28 carried respectively by the shafts 29 and 30 journaled in the side walls 3 and 4 of the harvester body. A bottom wall 1 of the body is provided with a depressed hopper portion 31 in which the endless conveyor and flights travel, the forward edge of the hopper 31 being positioned slightly forwardly of and beneath the rear edge of the tray 22.

A fan is provided for blowing the chaff and refuse from the machine, the same including an axial mounting 32 and fan plates 33, the fan being positioned beneath the endless conveyor and in proximity of the rear open end 6 of the body.

Sifting screens 34 are mounted in the frame 35 beneath the rear upper end of the conveyor while an inclined screen 36 positioned beneath the screens 34 directs the grain into the box 37, a dust box 38 being positioned beneath the inclined screen 36 as shown in Fig. 1.

The operating device for the parts above described embodies the provision of a gear 39 fixed to the axle 7 and in mesh with the gear 40 secured to the shaft 32 of the fan wheel. The endless conveyor chain 25 is driven through the medium of the gear 41 fixed to the axle 7 adjacent the ground wheel 9 and in mesh with the gear 42 secured to the stub shaft 43 journaled in the side wall 3 of the body, the shaft 43 carrying a sprocket chain 44 traversed by a chain 45 that passes over the sprocket wheel 46 and is secured to the shaft 29 of the conveyor. The grain topping device has the shaft 11 provided with a loose gear 47 traversed by a chain 48 that passes over the gear 49 fixed to the axle 7. To lock the loose gear 47 to the shaft 11 for operating the topping device, the clutch 50 splined to the shaft 11 has a clutch face cooperating with a clutch face upon the loose gear 47, the clutch 50 being shifted by the yoke 51 fixed at its end to the screw shaft 52 that projects upwardly through the top wall 2 of the body and is threaded through the bearing 53 with an operating handle 54 upon the extreme upper end.

In the operation of the device, the machine is moved forwardly by suitable draft devices and power for the moving parts is derived from the ground wheels 8 and 9. As the machine travels through a field of standing grain, the arms 18 carrying the prongs 19 will engage the upper ends of the grain stalks and cut the same by the prongs passing over the tray 22 and between the arch rods 23, the grain stalk opening and breaking between the rollers 20 and 24 with the grain pods and grain carried over the tray 22 into the hopper 31. The threshing of the grain is accomplished when the arms 18 pass over the tray 22 and the grain and chaff is carried by the flights 26 of the conveyor entering the hopper 21 upwardly of the screens 34, the grains falling through the screens 34 and onto the inclined screen 36 for delivery into the box 37. The fan 33 will blow the chaff through the rear open end 6 of the body while any chaff passing through the screens 34 with the grain will be received in the receptacle 38. The operation of the top or threshing arms 18 is controlled by the clutch 50 while the positions of the arms 18 with respect to the tray 32 is regulated by the screw shaft 14. The tensioned prongs 19' are slightly longer than the rigid prongs 19 to cause the same to travel in close proximity to the tray 22, thereby insuring the severance of the grain stalk while the resilient mounting of the grain stalks will permit the same escaping the flights 26 of the conveyor.

A modified form of the invention is shown in Fig. 6, the same differing from the construction in the preferred form only by the provision of prongs 55 carried by the tray 22' cooperating with the prongs 19 of the arms 18.

From the above detail description of the invention it is believed that the construction and operation will be readily understood and appreciated by those skilled in the art, and while there are herein shown and described the preferred embodiments of the invention it is nevertheless to be understood that minor changes may be made therein without departing from the spirit and scope of the invention.

What is claimed as new is:—

1. A threshing machine of the type described comprising a body, an endless conveyor in the body, a sifting screen positioned beneath the rear end of the conveyor, a fan disposed beneath the conveyor and sifting screen, means for severing grain pods from standing stalks and delivering the same to the conveyor, said means including circularly moving arms, radial prongs carried by the outer faces of the arms, and a tray over which the arms pass in separating the grain from the pods and delivering separated grain and pods to the conveyor.

2. A threshing machine of the type described comprising a body, an endless conveyor in the body, a sifting screen positioned beneath the rear end of the conveyor, a fan disposed beneath the conveyor and sifting screen, means for severing grain pods from standing stalks and delivering the same to the conveyor, said means including circularly moving arms, radial prongs carried by the outer faces of the arms, a tray over which the arms pass in separating the grain from the pods and delivering separated grain and pods to the conveyor, and rollers carried by the free ends of the arms.

3. A threshing machine of the type described comprising a body, an endless conveyor in the body, a sifting screen positioned beneath the rear end of the conveyor, a fan disposed beneath the conveyor and sifting screen, means for severing grain pods from standing stalks and delivering the same to the conveyor, said means including circularly moving arms, radial prongs carried by the outer faces of the arms, a tray over which the arms pass in separating the grain from the pods and delivering separated grain and pods to the conveyor, and rollers carried by the free ends of the arms and the forward edge of the tray.

4. A threshing machine of the type described comprising a body, an endless conveyor in the body, a sifting screen positioned beneath the rear end of the conveyor, a fan disposed beneath the conveyor and sifting screen, means for severing grain pods from standing stalks and delivering the same to the conveyor, said means including circularly moving arms, radial prongs carried by the outer faces of the arms, a tray carried by the body over which the arms pass, and a plurality of arched rods carried by the tray.

5. A threshing machine of the type described comprising a body, an endless conveyor in the body, a sifting screen positioned beneath the rear end of the conveyor, a fan disposed beneath the conveyor and sifting screen, means for severing grain pods from standing stalks and delivering the same to the conveyor, said means including circularly moving arms, radial prongs carried by the outer faces of the arms, a tray carried by the body over which the arms pass, a plurality of arched rods carried by the tray, and means for varying the relative positions of the arms and tray.

6. A threshing machine of the type described comprising a body, an endless conveyor in the body, a sifting screen positioned beneath the rear end of the conveyor, a fan disposed beneath the conveyor and sifting screen, means for severing grain pods from standing stalks and delivering the same to the conveyor, said means including circularly moving arms, radial prongs carried by the outer faces of the arms, a tray carried by the body over which the arms pass, a plurality of arched rods carried by the tray, means for varying the relative positions of the arms and tray, and means for controlling the circular movement of the arms.

In testimony whereof I affix my signature.

JAMES NOVAK.